N. V. TANNER.
APPARATUS FOR MEASURING LIQUIDS.
APPLICATION FILED MAR. 1, 1915.
1,171,476.
Patented Feb. 15, 1916.
3 SHEETS—SHEET 2.
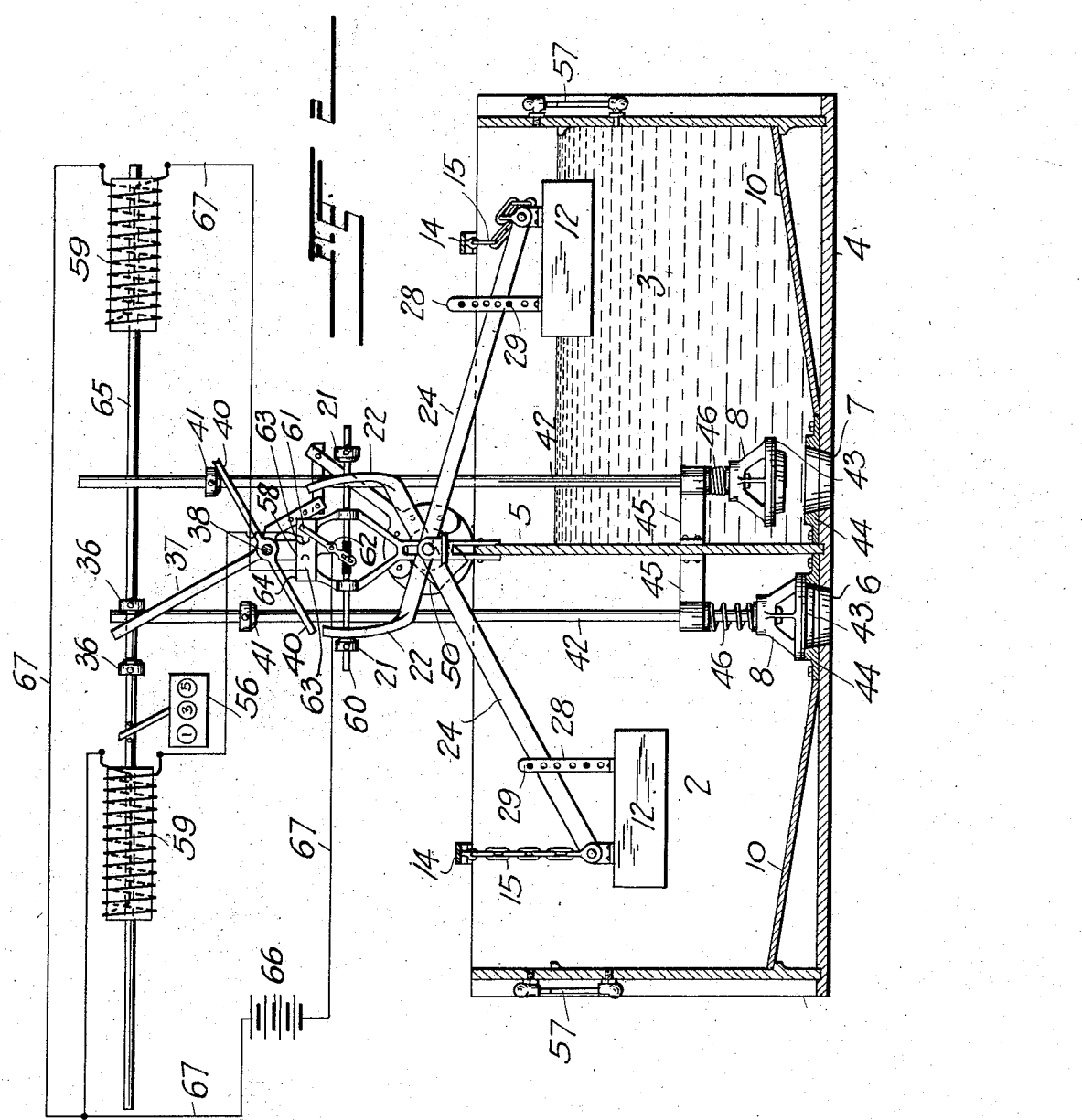
WITNESSES:
INVENTOR.
N. V. TANNER.
BY
ATTORNEY.

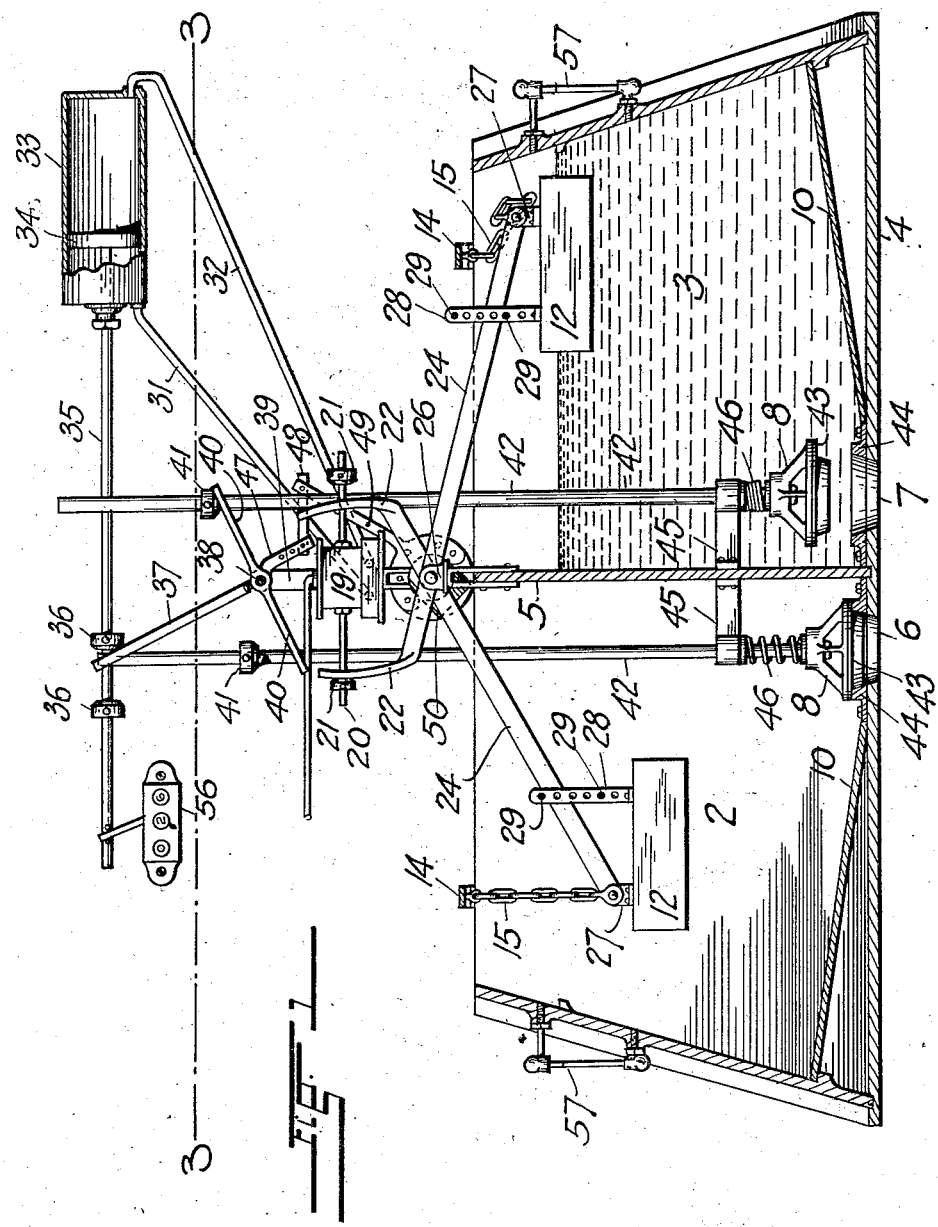

N. V. TANNER.
APPARATUS FOR MEASURING LIQUIDS.
APPLICATION FILED MAR. 1, 1915.
1,171,476.
Patented Feb. 15, 1916.
3 SHEETS—SHEET 3.
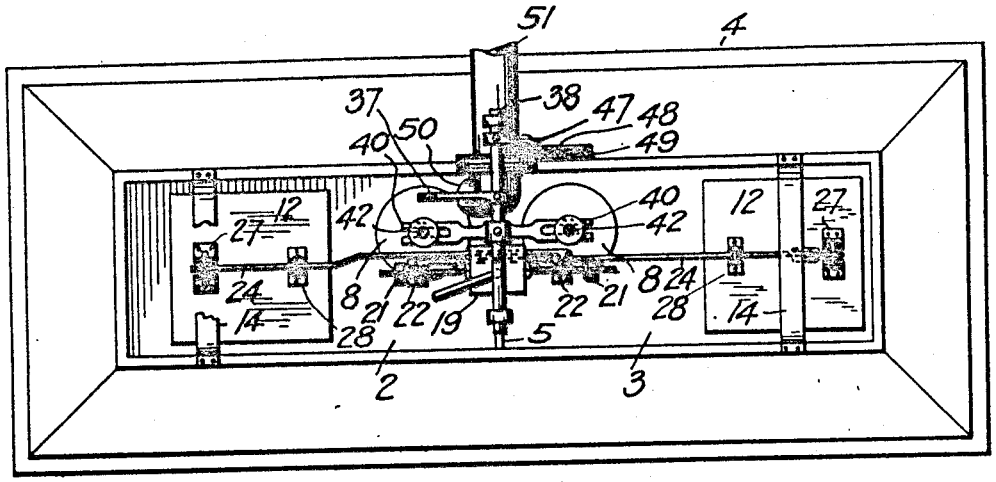
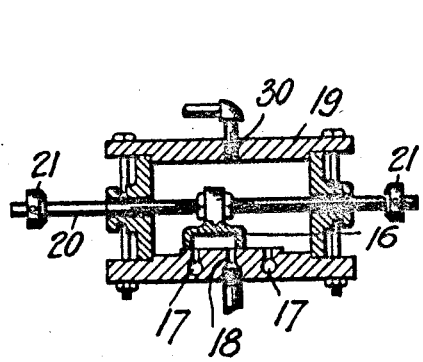
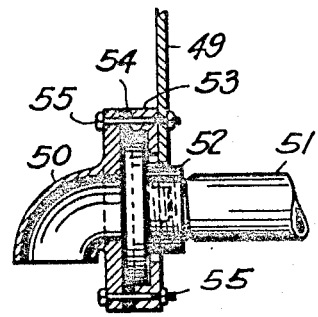
WITNESSES:
INVENTOR.
N. V. TANNER
BY
ATTORNEY.

UNITED STATES PATENT OFFICE.

NED V. TANNER, OF TONOPAH, NEVADA.

APPARATUS FOR MEASURING LIQUIDS.

1,171,476. Specification of Letters Patent. Patented Feb. 15, 1916.

Application filed March 1, 1915. Serial No. 11,257.

*To all whom it may concern:*

Be it known that I, NED V. TANNER, a citizen of the United States, residing at Tonopah, in the county of Nye and State of Nevada, have invented certain new and useful Improvements in Apparatus for Measuring Liquids, of which the following is a specification.

This invention relates to apparatus for measuring liquids and its principal object resides in providing a mechanism of simple, economical and effective construction which in its operation will automatically and accurately measure and deliver predetermined quantities of liquid from a supply continuously fed thereto.

With this and other objects in view, all of which will fully appear in the course of the following description, the apparatus comprises two containers and an association of coöperative elements which through the instrumentality of a pair of floats, reverse the condition of means by which the containers are alternately supplied with liquid and emptied of their contents, each time the liquid in one container or the other reaches a determinate level.

The floats after having been lifted to the determinate level of the liquid with which the containers are alternately supplied, act upon a device which controls the supply of motive fluid or electric current to an actuating element which operates to reverse through the medium of a suitable transmission mechanism, the position of valves which control the discharge of liquid through outlet openings in the containers and to synchronously reverse the position of the means through which liquid is supplied to the same.

Having thus briefly described the nature of my invention and the coöperative relation of the elements comprised therein, I will now proceed to explain the same in detail with reference to the accompanying drawings, in the various views of which like parts are similarly designated and in which, Figure 1 is a sectional elevation of my improved measuring apparatus in the form designed to be operated by a motive fluid, Fig. 2, a view similar to that shown in Fig. 1 showing the construction of the apparatus in the form designed to be operated by electricity, Fig. 3, a horizontal section on a plane indicated by the line 3—3, in Fig. 1, Fig. 4, a vertical section of the valve housing and valve forming part of the mechanism shown in Fig. 1, drawn to an enlarged scale, and Fig. 5, an enlarged section through the spout of the conduit by means of which the liquid to be measured is supplied to the containers.

Referring first to Figs. 1, 3, 4 and 5 of the drawings, the reference numerals 2 and 3 designate two containers which are preferably provided by dividing a tank 4 into two compartments by means of a transverse partition 5. The tank has at opposite sides of the partition and in suitable adjacency to the same, outlet openings 6 and 7 the flow through which is controlled by vertically moving valves 8.

The compartments may be provided with false bottoms 10 which slant from their outer ends toward the respective outlet to accelerate the outflow of liquid and insure the complete drainage of the compartments before the respective valves are moved to their closing position by a hereinafter to be described mechanism the operation of which is controlled by floats designated by the numerals 12. These floats consist of hollow metal boxes which, when the respective compartments are partially or entirely empty, are suspended from cross bars 14 on the top of the tank by means of chains 15 which limit their downward movement and which relieve the parts of the valve-operating mechanism, connected with the floats, from the detrimental influence of their weight during the period of their suspension above the level of the liquid with which the compartments are alternately supplied.

The sides and ends of the tank 4 slant from the bottom of the same inwardly whereby the horizontal area of the compartments is gradually decreased from their bottom surfaces upwardly. This construction of the containers effects a gradual increase of the velocity with which the liquid rises in the tank, and it in consequence, greatly increases the accuracy of the valve operating mechanism which remains in a condition of rest until the liquid reaches a predetermined level.

The mechanism which is operated by the movement of the floats to alternately open the valves 8 and to simultaneously reverse the condition of a feed conduit hereinafter to be described, comprises a slide valve 16 of the D type which as best shown in Fig. 4 of the drawings, controls the flow of motive fluid through two inlet ports 17 and an intermediate exhaust port 18 formed in a bearing surface of a valve-chest 19 in which had been filled with material, is held in a raised position by the engagement of the respective tappet arm 40 on the rock shaft with the collar 41 on its rod. It will thus be seen that while the one compartment is being supplied with material through the spout 50, the contents of the other compartment are being discharged through the outlet in its bottom. As the liquid rises in the compartment which is being filled, the float is carried upwardly and gradually moves the lever 24 with which it is pivotally connected, about its fulcrum, thereby compelling the tappet 22 at the end of the short arm of the lever to approach the collar 21 on the valve stem 20 from which it is normally separated. The float in the other compartment at the same time descends with the level of the liquid, until its movement is arrested by the chain 15, and the tappet on its lever 24 moves away from the collar 21 on the valve stem with which it was in engagement. At a determined point in the movement of the rising float, the tappet on the lever engages the respective collar on the valve stem thereby effecting a movement of the slide valve until when the liquid in the compartment has reached the predetermined level, its position is reversed. The reversal of the slide valve places the end of the cylinder at which the piston is positioned, in communication with the supply of motive fluid, and the opposite end of the same in connection with the exhaust port in the valve chest, with the result that the piston is compelled to move to the opposite end of its cylinder. This movement of the piston imparts by the engagement of one of the collars 36 on its rod, with the arm 37, a partial rotation to the rock shaft 38 on which said arm is mounted, and the rotary movement of the shaft is through the instrumentality of the arm 47 transmitted to the rotary spout 50 of the supply conduit the position of which is in consequence reversed to supply liquid to the empty compartment. Synchronously with the reversal of the position of the spout 50, the positions of the two valves 8 are reversed by the action of the two oppositely extending tappet arms 40 of the two oppositely extending tappet arms 40 upon the respective collars 41 on the valve rods 42, so that prior to the supply of material to the empty compartment its outlet opening is closed while that of the compartment which previously had been filled, is opened for the discharge of its contents.

From the above description it will be seen that in the operation of the apparatus, predetermined quantities of liquid are accurately measured and delivered at regular intervals into the launders or other conductive means which convey the liquid to the place at which it is to be used.

The number of quantities of liquid delivered by the apparatus during the time of its operation, may be registered by the use of a counter 56 which is operatively associated with the piston rod, and the accuracy of the apparatus in measuring the desired quantities may be verified at any time by means of gages 57 applied exteriorly of the compartments and provided with a mark designating the level to which the liquid must rise in the compartment before the position of the operating mechanism is reversed.

In the construction illustrated in Fig. 2 of the drawings, the apparatus is operated by an electrically energized actuative element instead of by the fluid impelled piston of the form hereinabove described. A circuit controlling device 58 is in this construction the equivalent of the slide valve, and a pair of solenoids 59 is provided to take the place of the cylinder and piston of the other form.

The circuit controlling device as shown in the drawings, comprises a reciprocating rod 60, which, like the valve stem of the other construction, carries the collars 21 for engagement with the tappet arms 22 on the levers 24. A contact arm 61 pivoted, as at 62, is operatively connected with the rod to alternately engage stationary, insulated contact pieces 63 on a suitably fixed support 64. A reciprocating rod 65 takes the place of the piston rod and is like the other, provided with collars 36 for engagement with the arm 37 on the rock shaft. The end portions of the rod constitute the cores of the pair of solenoids 59 which are connected in circuits with a source of electricity 66. The circuit controlling device is designed to open and close these circuits to alternately energize the solenoids and thereby move the rod 65 alternately in opposite directions, it being observed that the contact pieces 63 are positioned relative to the movable contact member, so that when the latter is in its extreme positions, one circuit is open and the other circuit is closed, whereby the parts are held in their adjusted positions, while one compartment of the container is being filled and the other one is emptying. The conductors of electricity comprised in the circuits have been designated by the numerals 67.

All the parts of the apparatus except those above referred to, are identical in their construction and operative arrangement, with those of the first described form, and further description of the same is thought to be unnecessary at this point.

The tank shown in Fig. 2 of the drawings is rectangular in cross section, it being understood that while the form shown in Fig. 1 is preferable, it is not positively essential in the operation of the apparatus.

Having described my improved measuring device in the best form at present known to me, I desire it understood that variations in the arrangement and construction of the different elements comprised therein, may be resorted to without departing from the spirit of my invention as set forth in the appended claims.

Claims:

1. A measuring apparatus comprising two containers having openings for the discharge of their contents, independently self-closing valves controlling the flow through said openings, a conduit which is adjustable to supply material alternately to the containers, floats in said containers, and mechanism for opening either valve by movement of the float in the respective container to a determinate level, and for simultaneously varying the condition of the conduit to supply material to the other container.

2. A measuring apparatus comprising two containers having outlets for the discharge of their contents, valves controlling the flow through said outlets, a conduit adjustable to supply material alternately to said containers, floats in the containers, a fluid-operated actuative element, mechanism for effecting by the action of said element, movements of the valves to alternately open and close the respective outlets of the containers, and a simultaneous variation in the condition of the conduit to supply material alternately to the two containers, a device automatically controlling the supply of a motive fluid to the said element, and means for the operation of said device by action of the floats.

3. A measuring apparatus comprising two containers having outlets for the discharge of their contents, valves controlling the flow through said outlets, a conduit adjustable to supply material alternately to said containers, floats in the containers, a fluid-operated actuative element including a reciprocating member, a device automatically controlling the supply of a motive fluid to the said element to alternately move its said member in opposite directions, means for the operation of said device by the action of the floats, and mechanism for effecting by the movements of said member, movements of the valves to alternately open and close the respective outlets in the containers, and a simultaneous variation in the condition of the conduit to supply material alternately to the two containers.

4. A measuring apparatus comprising two containers having outlets for the discharge of their contents, valves controlling the flow through said outlets, a conduit adjustable to supply material alternately to said containers, floats in the containers, an actuative element including a reciprocating member, a device controlling the supply of a motive agent to the said element to alternately move its said member in opposite directions, means for the operation of said device by the action of the floats, and a rock shaft adapted to be operated by the movements of said member, and operatively connected with the two valves to move them alternately for opening the respective outlets of the containers, and with the said conduit to vary its condition for supplying material alternately to the two containers.

5. A measuring apparatus comprising two containers having outlets for the discharge of their contents, valves controlling the flow through said outlets, a conduit adjustable to supply material alternately to said containers, floats in the containers, an actuative element including a reciprocating member, a device controlling the supply of a motive agent to the said element to alternately move its said member in opposite directions, means for the operation of said device by the action of the floats, adjustable collars on said member, and a rock shaft having an arm disposed to be engaged by said collars for moving the shaft alternately in opposite directions, the said shaft having an operative connection with the two valves to move them alternately for opening the respective outlets of the containers, and with the said conduit to vary its condition for supplying material alternately to the two containers.

6. A measuring apparatus comprising two containers having outlets for the discharge of their contents, valves mounted on vertically movable rods, to control the flow through said outlets, a conduit adjustable to supply material alternately to the said containers, an actuative element including a reciprocating member, a device controlling the supply of a motive agent to the said element, floats in the containers, means for the operation of said device by action of said floats, a rock shaft adapted to be operated by the movements of said member, and having arms operatively connected with the valve-rods to lift their valves alternately from their closing positions, and means for varying the condition of the conduit by the action of the rock-shaft to supply material alternately to the containers.

7. A measuring apparatus comprising two containers having outlets for the discharge of their contents, valves mounted on vertically movable rods, to control the flow through said outlets, a conduit adjustable to supply material alternately to the said containers, an actuative element including a reciprocating member, a device controlling the supply of a motive agent to the said element, floats in the containers, means for the operation of said device by action of said floats, a rock shaft adapted to be operated by the movements of said member, adjustable collars on the valve rods, arms on the rock shaft, disposed to engage said collars whereby to lift their valves alternately from their closing positions, and means for varying the condition of the conduit by the action of the rock-shaft to supply material alternately to the containers.

8. A measuring apparatus comprising two containers having outlets for the discharge of their contents, valves mounted on vertically movable rods, to control the flow through said outlets, a conduit rotatable to supply material alternately to the said containers, a lever on said conduit, an actuative element including a reciprocating member, a device controlling the supply of a motive agent to the said element, floats in the containers, means for the operation of said device by action of said floats, a rock shaft adapted to be operated by the movements of said member, and having arms operatively connected with the valve-rods to lift their valves alternately from their closing positions, and an arm operatively connected with the lever on the conduit for imparting a rotary movement to the same.

9. A measuring apparatus comprising two containers having outlets for the discharge of their contents, valves controlling the flow through said outlets, a conduit adjustable to supply material alternately to said containers, floats in the containers, an actuative element, mechanism for effecting by the action of said elements, movements of the valves to alternately open and close the respective outlets of the containers, and a simultaneous variation in the condition of the conduit to supply material alternately to the two containers, a device controlling the supply of a motive agent to the said element, including a reciprocating member, and levers operatively connecting said floats with said member, for moving the latter alternately in opposite directions by the action of the floats when reaching determinate levels in the respective containers.

10. A measuring apparatus comprising two containers having outlets for the discharge of their contents, valves controlling the flow through said outlets, a conduit adjustable to supply material alternately to said containers, floats in the containers, an actuative element, mechanism for effecting by the action of said element, movements of the valves to alternately open and close the respective outlets of the containers, and a simultaneous variation in the condition of the conduit to supply material alternately to the two containers, a device controlling the supply of a motive agent to the said element, including a reciprocating member, adjustable collars on said member, and levers connected with said floats and adapted to engage said collars for moving the member alternately in opposite directions by action of the floats when reaching determinate levels in the respective containers.

11. A measuring apparatus comprising two containers having outlets for the discharge of their contents, valves controlling the flow through said outlets, a conduit adjustable to supply material alternately to said containers, floats in the containers, an actuative element including a cylinder and a piston having a reciprocating movement therein, mechanism for effecting by the movements of said piston, movements of the valves to alternately open the respective outlets of the containers, and a simultaneous variation in the condition of the conduit to supply material alternately to the two containers, a valve controlling the supply of motive fluid to the cylinder, and means for the operation of said valve by action of the floats.

12. A measuring apparatus comprising two containers having outlets for the discharge of their contents, valves controlling the flow through said outlets, a conduit adjustable to supply material alternately to said containers, floats in the containers, an actuative element including a cylinder, and a piston having a reciprocating movement therein, mechanism for effecting by the movements of said piston, movements of the valves to alternately open the respective outlets of the containers, and a simultaneous variation in the condition of the conduit to supply material alternately to the two containers, a reciprocating valve controlling the supply of motive fluid to the cylinder, and levers connecting the floats with the said valve for moving it alternately in opposite directions by action of the floats when reaching determinate levels in the respective containers.

13. A measuring apparatus comprising two containers having openings for the discharge of their contents, spring-pressed, independently closing valves controlling the flow through said openings, a conduit which is adjustable to supply material alternately to the containers, floats in said containers, and mechanism for opening either valve by movement of the float in the respective container to a determinate level, and for simultaneously varying the condition of the conduit to supply material to the other container.

In testimony whereof I have affixed my signature in presence of two witnesses.

NED V. TANNER.

Witnesses:
F. A. MAHAN,
FRED. H. PENN.